(12) United States Patent
Zheng et al.

(10) Patent No.: US 10,054,052 B2
(45) Date of Patent: Aug. 21, 2018

(54) NACELLE ANTI-ICE SYSTEM AND METHOD WITH EQUALIZED FLOW

(71) Applicant: UNITED TECHNOLOGIES CORPORATION, Farmington, CT (US)

(72) Inventors: Zhijun Zheng, Avon, CT (US); Michael D. Greenberg, Bloomfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 423 days.

(21) Appl. No.: 14/793,441

(22) Filed: Jul. 7, 2015

(65) Prior Publication Data

US 2017/0009653 A1    Jan. 12, 2017

(51) Int. Cl.
*F02C 7/047* (2006.01)
*B64D 15/04* (2006.01)
*F02C 6/08* (2006.01)

(52) U.S. Cl.
CPC .............. *F02C 7/047* (2013.01); *B64D 15/04* (2013.01); *F02C 6/08* (2013.01); *F05D 2270/112* (2013.01)

(58) Field of Classification Search
CPC . F02C 7/047; F02C 6/08; B64D 15/04; F05D 2270/112; F01D 25/02; F01D 25/10
See application file for complete search history.

(56) References Cited

U.S. PATENT DOCUMENTS

| 535,928 | A | 3/1895 | Spiller | |
|---|---|---|---|---|
| 2,747,365 | A | 5/1956 | Rainbow | |
| 3,981,466 | A | 9/1976 | Shah | |
| 4,482,114 | A | 11/1984 | Gupta et al. | |
| 4,775,117 | A * | 10/1988 | Standke | B64D 15/20 244/134 B |
| 4,783,026 | A | 11/1988 | Rumford et al. | |
| 6,267,328 | B1 * | 7/2001 | Vest | B64D 15/04 239/599 |
| 6,371,411 | B1 * | 4/2002 | Breer | F02C 7/047 244/134 B |
| 6,442,944 | B1 | 9/2002 | Skur | |
| 6,688,558 | B2 * | 2/2004 | Breer | B64D 15/04 244/134 B |
| 2009/0108134 | A1 | 4/2009 | Thodiyil et al. | |

(Continued)

FOREIGN PATENT DOCUMENTS

| EP | 2740981 A1 | 6/2014 |
|---|---|---|
| GB | 2461385 A | 1/2010 |

OTHER PUBLICATIONS

European Search Report for EP Application No. EP 16 17 8484.

*Primary Examiner* — Woody Lee, Jr.
*Assistant Examiner* — Adam W Brown
(74) *Attorney, Agent, or Firm* — Cantor Colburn LLP (57) ABSTRACT

A gas turbine engine is provided having a nacelle and a compressor section constructed and arranged to generate hot air. An anti-icing system is constructed and arranged to discharge the hot air from the compressor section to the nacelle. An anti-icing valve is positioned in the anti-icing system and constructed and arranged to control a flow of the hot air from the compressor section to the nacelle. The anti-icing valve includes a partially open position to constrict a flow of the hot air from the compressor section to the nacelle.

17 Claims, 6 Drawing Sheets

(56) References Cited

U.S. PATENT DOCUMENTS

| | | | |
|---|---|---|---|
| 2010/0175388 A1* | 7/2010 | Tillery | F01D 25/10 60/785 |
| 2013/0000321 A1* | 1/2013 | Arar | F02C 6/08 60/785 |
| 2014/0150902 A1 | 6/2014 | Pirat | |
| 2014/0245749 A1 | 9/2014 | Mercier et al. | |
| 2014/0321967 A1 | 10/2014 | Zhang et al. | |
| 2015/0034767 A1 | 2/2015 | Pirat | |

* cited by examiner

NACELLE ANTI-ICE SYSTEM AND METHOD WITH EQUALIZED FLOW

TECHNICAL FIELD OF THE DISCLOSED EMBODIMENTS

The embodiments herein generally relate to gas turbine engines and, more particularly, to an anti-icing system for a gas turbine engine.

BACKGROUND OF THE DISCLOSED EMBODIMENTS

Generally, gas turbine engines typically include a fan delivering air into a bypass duct defined within a nacelle. Air is also delivered into the engine core. The air flowing through the engine core passes through a compressor section. The air then passes into a combustion section. In the combustion section the air is mixed with fuel and ignited. Products of this combustion pass downstream over turbine rotors.

It is known to provide a nacelle anti-icing system in the gas turbine engine. The nacelle anti-icing system typically will tap hot air from the compressor section. The hot air is selectively delivered to the lip of the nacelle to provide anti-icing at the lip of the nacelle. This anti-icing function is performed selectively and is not necessary during much of the operation of a gas turbine engine on an aircraft. However, when conditions indicate that there may be icing at the lip of the nacelle, a valve may be opened to deliver the hot air to that location.

An anti-icing system may use a series two-valve configuration to improve the dispatch rate for the aircraft. While both valves are capable of shut off and regulation independently, typically, there is a primary valve that performs the regulation all the time (with a lower regulating set point) and both valves perform the shut off function alternatively. Should the primary valve become incapable of regulating, the operator will lock the primary valve open, and thus enable the secondary valve to regulate. However, since the secondary valve has a higher pressure regulating set point for system stability reasons, the flow will be higher which drives excessive bleed extraction from the engine core flow, increasing both fuel consumption as well as driving the nacelle inlet lip skin higher than it needs to be. It is therefore desirable to have a system that is both stable and has the same flow in both the normal and back up modes. Two mechanical pressure regulating valves with the same setpoint in series would become inherently unstable, especially with the upper valve sensing regulated pressure between the two valves.

SUMMARY OF THE DISCLOSED EMBODIMENTS

In one aspect, a gas turbine engine is provided having a nacelle and a compressor section constructed and arranged to generate hot air. An anti-icing system is constructed and arranged to discharge the hot air from the compressor section to the nacelle. An anti-icing valve is positioned in the anti-icing system and constructed and arranged to control a flow of the hot air from the compressor section to the nacelle. The anti-icing valve includes a partially open position to constrict a flow of the hot air from the compressor section to the nacelle.

In a further aspect of the above, the anti-icing valve includes a locking mechanism operative to lock the anti-icing valve in the partially open position.

In a further aspect of any of the above, the locking mechanism is operative to lock the anti-icing valve in a ¾ open position.

In a further aspect of any of the above, the engine includes a control operatively coupled to the anti-icing valve and operative to open and close the anti-icing valve.

In a further aspect of any of the above, the engine includes a conduit constructed and arranged to channel the hot air from the compressor section to the nacelle.

In a further aspect of any of the above, the engine includes a nozzle positioned adjacent the nacelle and constructed and arranged to discharge the hot air onto the nacelle.

In a further aspect of any of the above, the engine includes a bleed valve constructed and arranged to bleed excess hot air from the compressor section.

In one aspect anti-icing system for a gas turbine engine having a compressor section in flow communication with a nacelle is provided. The anti-icing system includes a conduit constructed and arranged to channel hot air from a compressor section to a nacelle. An anti-icing valve is constructed and arranged to control a flow of the hot air from the compressor section to the nacelle. The anti-icing valve included a partially open position to constrict a flow of the hot air from the compressor section to the nacelle.

In a further aspect of the above, the anti-icing valve includes a locking mechanism operative to lock the anti-icing valve in the partially open position.

In a further aspect of any of the above, the locking mechanism is operative to lock the anti-icing valve in a ¾ open position.

In a further aspect of any of the above, the system includes a control operatively coupled to the anti-icing valve and operative to open and close the anti-icing valve.

In a further aspect of any of the above, the system includes a nozzle positioned adjacent the nacelle and constructed and arranged to discharge the hot air onto the nacelle.

In a further aspect of any of the above, the system includes—a bleed valve constructed and arranged to bleed excess hot air from the compressor section.

In one aspect, a method of de-icing a nacelle in a gas turbine engine having a compressor section is provided. The method includes generating hot air in the compressor section. The method also includes discharging the hot air through an anti-icing system from the compressor section to the nacelle. The method also includes controlling a flow of the hot air from the compressor section to the nacelle with an anti-icing valve. The method also includes positioning the anti-icing valve in a partially open position to constrict a flow of the hot air from the compressor section to the nacelle.

In a further aspect of the above, the method includes locking the anti-icing valve in the partially open position.

In a further aspect of any of the above, the method includes locking the anti-icing valve in a ¾ open position.

In a further aspect of any of the above, the method includes operating a control to open and close the anti-icing valve.

In a further aspect of any of the above, the method includes channeling the hot air from the compressor section to the nacelle through a conduit.

In a further aspect of any of the above, the method includes discharging the hot air onto the nacelle through a nozzle.

In a further aspect of any of the above, the method includes bleeding excess hot air from the compressor section with a bleed valve.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
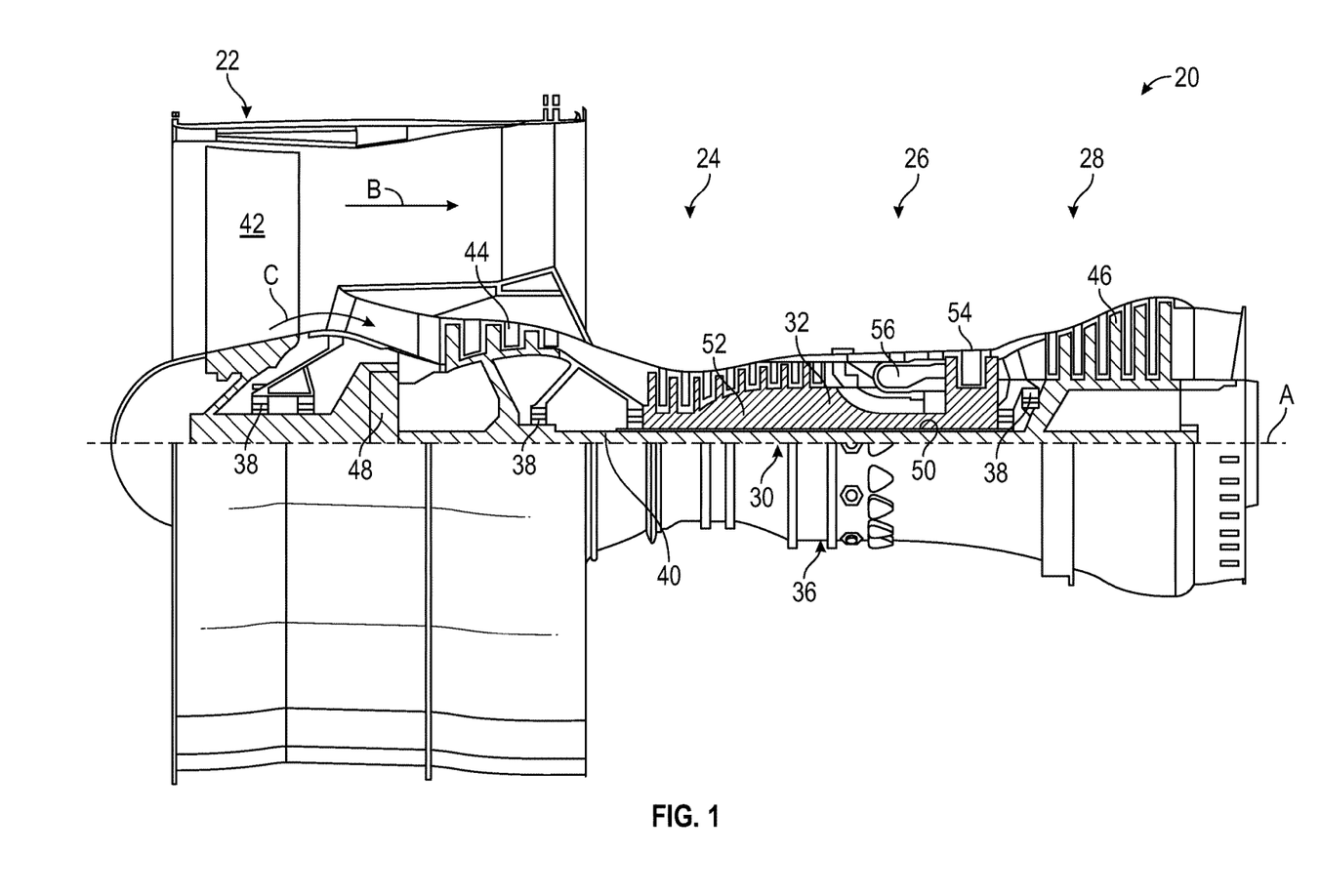
FIG. 1 is a sectional view of a gas turbine engine in an embodiment.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") or Structural Guide Vane ("SGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tfan ° R)/ (518.7° R)]$^{0.5}$. The "Low corrected fan tip speed" as disclosed herein according to one non-limiting embodiment is less than about 1150 ft/second (350.5 m/sec).

Figure 2:
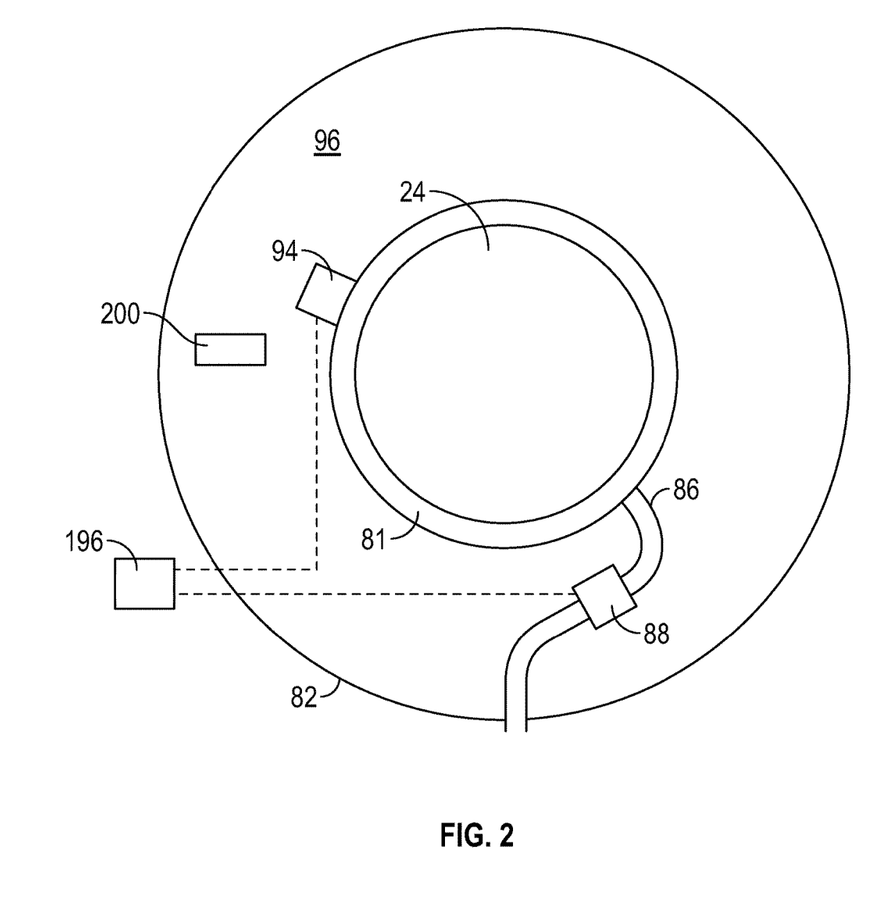
FIG. 2 is a sectional view of a high pressure compressor section in an embodiment.

FIG. 2 shows the compressor section 24 having an inner wall 81, and an outer wall 82. The compressor section is provided with a compressor stability bleed valve 94. This valve is under the control of a control 196 which selectively opens the bleed valve 94 during engine startup such that compressed air is dumped outwardly of the compressor section 24 into a chamber 96. This reduces the load on the compressor rotors as they begin to rotate. As can be appreciated, the compressor stability bleed valve 94 dumps air into the chamber 96, and thus, components 200, shown schematically, within the space 96 are exposed to this hot air.

Figure 3:
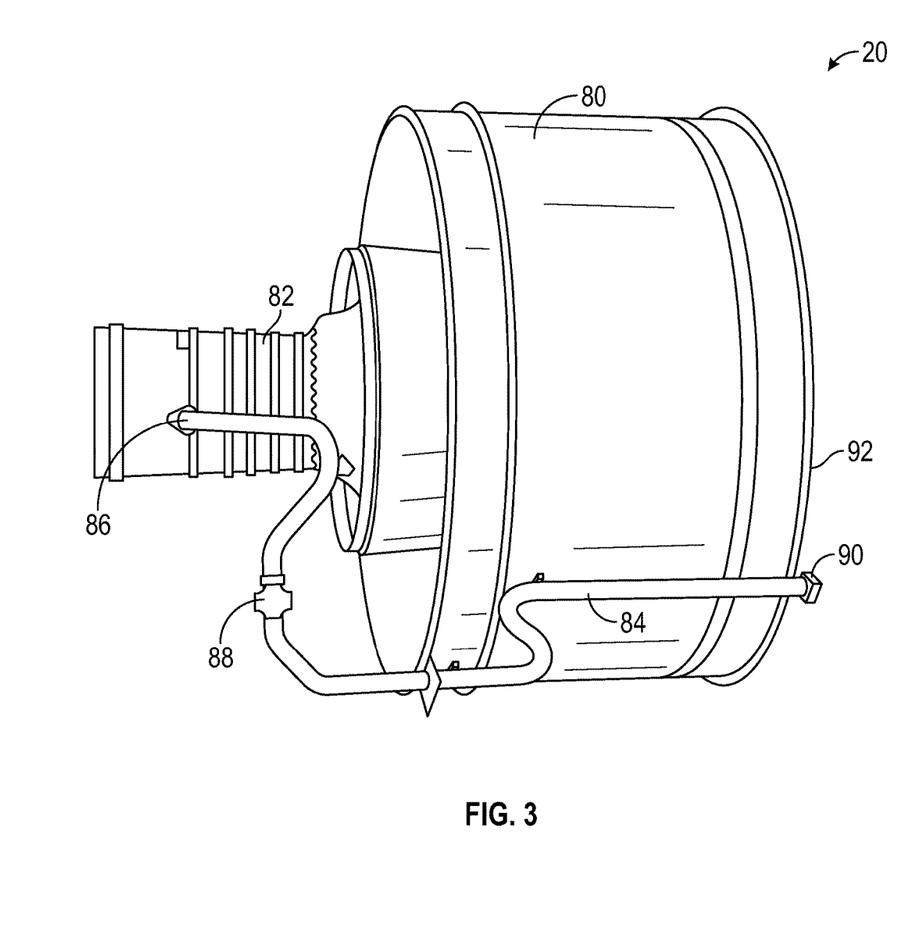
FIG. 3 illustrates details of a gas turbine engine in an embodiment.

The control 196 also controls an anti-ice valve 88. The anti-ice valve 88 also includes a tap 86 for tapping compressed air. As would be understood by one of ordinary skill in the art, this compressed air would be hot. As shown in FIG. 3, compressed air from the tap 86 passes through the anti-ice valve 88, into a conduit 84, and then to a nozzle 90 associated with a lip 92 at an upstream end of the nacelle 80. The nozzle 90 discharges air in opposed circumferential directions such that the lip 92 is provided with this hot air, should conditions indicate that there may be icing. Typically, the anti-ice valve 88 would not be left open at all times, as that would reduce the efficiency of the compressor section 24.

Figure 4:
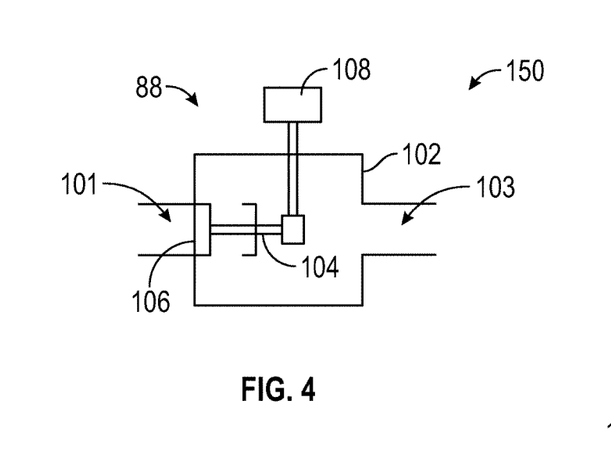
FIG. 4 is a sectional view of an anti-icing valve in a closed position in an embodiment.
Figure 5:
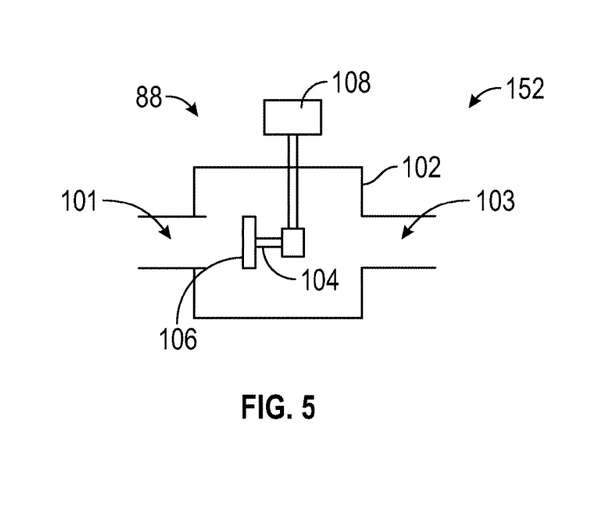
FIG. 5 is a sectional view of the anti-icing valve of FIG. 4 in an open position.
Figure 6:
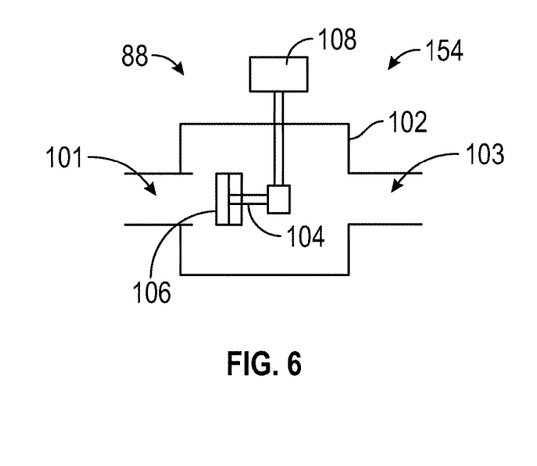
FIG. 6 is a sectional view of the anti-icing valve of FIG. 4 in a partially open position.

FIG. 4 illustrates an anti-icing valve 88 formed in accordance with an embodiment and locked in a "Normal Operation" position 150. FIG. 5 illustrates the anti-icing valve 88 in an open position 152. —FIG. 6 illustrates the anti-icing valve 88 locked in a partially open position 154. The valve 88 includes a housing 102 having an inlet 101 and an outlet 103. Hot air flows through the valve 88 from the inlet 101 to the outlet 103. A piston 104 is positioned within the housing 102 and includes a plug 106 at an end thereof. A pressure regulation mechanism may control the position of the plug 106 within the housing to regulate pressure downstream of the valve. In the event the valve would become non-operational, it could be locked in multiple positions. A locking mechanism 108 is coupled to the piston 104 to control a position of the piston 104. By controlling a position of the piston 104, a position of the plug 106 within the housing 102 may be controlled. The locking mechanism 108 moves the plug 106 between the closed position 150 (FIG. 4) and the open position 152 (FIG. 5) to control the flow of hot air through the valve 88 from the inlet 101 to the outlet 103. In particular, the locking mechanism 108 locks the valve 88 in at the pre-calibrated partial open position 152 or the normal operation position 150 by disengaging the pinion gear 116 from the rack 114 shown in FIG. 7.

In one embodiment, shown in FIG. 6, the locking mechanism 108 on the anti-icing valve 88 is configured, so that rather than locking the anti-icing valve 88 in the full open position 152, the anti-icing valve 88 locks the piston 104 at a pre-calibrated partial open position 154. The pre-calibrated partial open position 154 restricts the hot air flow going through the anti-icing valve 88. The locking mechanism 108 resolves the issue with the existing two valve configuration that the regulated set points of the anti-icing valve 88 and bleed valve 94 have to be separated far enough so that the lower end of the regulation tolerance band of the higher regulating valve does not overlap with the upper end of the regulation tolerance band of the lower regulating valve, thereby resulting in a large variation of regulating pressure. With the upper valve controlling pressure downstream of it to a given value, and a subsequently partially open lower valve after the regulating valve, the overall system setpoint will be lowered to the value of the primary valves setpoint. This is achieved using the locking mechanism 108, to make the partially locked open valve act like a fixed orifice.

Figure 7:
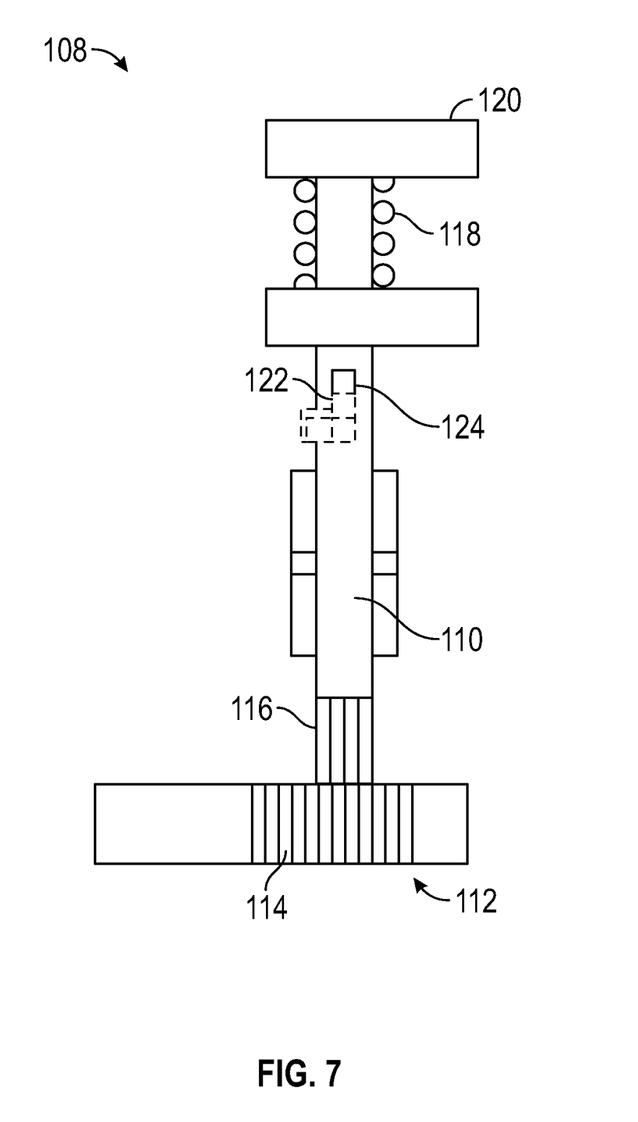
FIG. 7 is a schematic of a locking mechanism formed in accordance with an embodiment.

FIG. 7 illustrates an embodiment of a locking mechanism 108 formed in accordance with an embodiment. The locking mechanism 108 includes a rod 110 that is removably coupled to the piston 104 through a rack and pinion gear 112, wherein the rack 114 is positioned on the piston 104 and a pinion gear 116 is provided at an end of the rod 110. A spring 118 biases the rod 110 pinion gear 116 out of contact from the rack 114 (and hence the piston 104). The rod 110 is movable into contact with the piston 104 by axially displacing (such as by use of a linear actuator (not shown) to name just one non-limiting example) a turn mechanism 120 coupled to the rod 110. Axial displacement of the turn mechanism toward the rack 114 collapses the spring 118, allowing the pinion gear 116 to engage the rack 114. The turn mechanism 120 may then be turned to rotate the pinion gear 116, thus moving the rack 114 and the piston 104 to the full open position 152, then rotate back to a partially open position 154.

In the illustrated embodiment a notch 122 is provided in the rod 110. The notch 122 enables a pin 124 to be inserted therein to retain a rotational and linear position of the rod 110. As such, the rod 110 may be locked into a position such that the pinion gear 116 is locked in engagement with the rack 114. At this rotational position, the piston 104 becomes locked in the pre-calibrated partial open position 154. Other embodiments of the locking mechanism may be considered.

Figure 8:
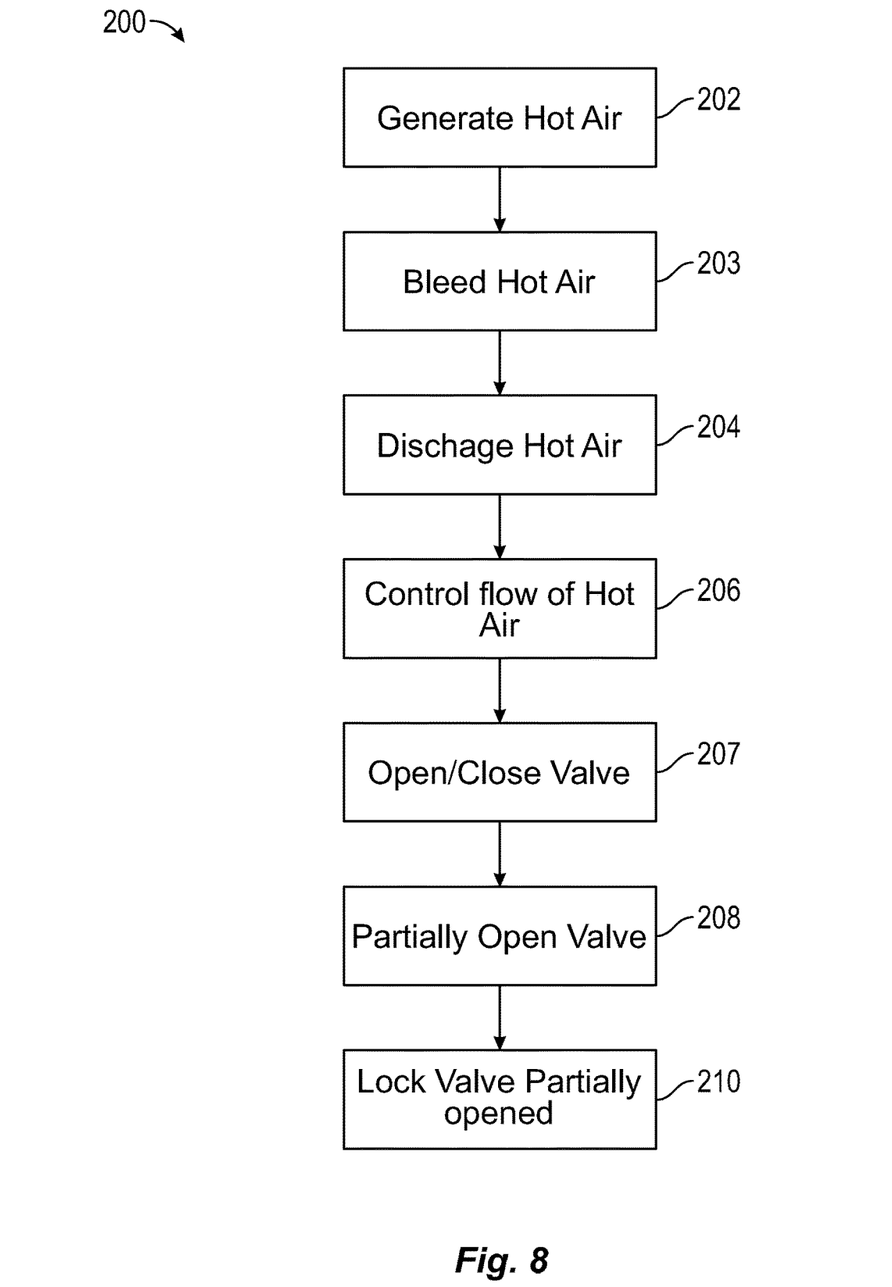
FIG. 8 illustrates a method of de-icing a nacelle in a gas turbine engine.

FIG. 8 illustrates a method 200 of de-icing a nacelle in a gas turbine engine having a compressor section 24. The method 200 includes generating hot air in the compressor section 24 at step 202. At step 203, excess hot air is bled from the compressor section 24 with a bleed valve 94. The method 200 further includes discharging the hot air through an anti-icing system from the compressor section 24 to the nacelle at step 204. For example, the hot air is channeled from the compressor section 24 to the nacelle through a conduit. In one embodiment, the hot air is discharged onto the nacelle through a nozzle. At step 206, a flow of the hot air from the compressor section 24 to the nacelle is controlled with an anti-icing valve 88. At step 207 a control opens and closes the anti-icing valve 88. At step 208 the anti-icing valve 88 is positioned in a partially open position to constrict a flow of the hot air from the compressor section 24 to the nacelle. In one embodiment, at step 210 the anti-icing valve 88 is locked in the partially open position. In one embodiment, the anti-icing valve 88 is locked in a ¾ open position.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. A gas turbine engine comprising:
   a nacelle;
   a compressor section constructed and arranged to generate hot air;

an anti-icing system constructed and arranged to discharge the hot air from the compressor section to the nacelle; and an anti-icing valve positioned in the anti-icing system and constructed and arranged to control a flow of the hot air from the compressor section to the nacelle, the anti-icing valve including a partially open position to constrict a flow of the hot air from the compressor section to the nacelle, wherein the anti-icing valve includes a locking mechanism operative to lock the anti-icing valve in the partially open position, the locking mechanism comprising:

a rod that is removably coupled to a piston through a rack and a pinion gear, wherein the rack is positioned on the piston and a pinion gear is provided at an end of the rod, and wherein the rod is movable into contact with the piston by axially displacing a turn mechanism coupled to the rod; and a spring biases the pinion gear of the rod out of contact from the rack, wherein axial displacement of the turn mechanism toward the rack collapses the spring allowing the pinion gear of the rod to engage the rack.

2. The gas turbine engine of claim 1, wherein the locking mechanism is operative to lock the anti-icing valve in a ¾ open position.

3. The gas turbine engine of claim 1 further comprising a control operatively coupled to the anti-icing valve and operative to open and close the anti-icing valve.

4. The gas turbine engine of claim 1 further comprising a conduit constructed and arranged to channel the hot air from the compressor section to the nacelle.

5. The gas turbine engine of claim 1 further comprising a nozzle positioned adjacent the nacelle and constructed and arranged to discharge the hot air onto the nacelle.

6. The gas turbine engine of claim 1 further comprising a bleed valve constructed and arranged to bleed excess hot air from the compressor section.

7. An anti-icing system for a gas turbine engine having a compressor section in flow communication with a nacelle, the anti-icing system comprising:

a conduit constructed and arranged to channel hot air from a compressor section to a nacelle; and an anti-icing valve constructed and arranged to control a flow of the hot air from the compressor section to the nacelle, the anti-icing valve including a partially open position to constrict a flow of the hot air from the compressor section to the nacelle, wherein the anti-icing valve includes a locking mechanism operative to lock the anti-icing valve in the partially open position, the locking mechanism comprising:

a rod that is removably coupled to a piston through a rack and a pinion gear, wherein the rack is positioned on the piston and a pinion gear is provided at an end of the rod, and wherein the rod is movable into contact with the piston by axially displacing a turn mechanism coupled to the rod; and a spring biases the pinion gear of the rod out of contact from the rack, wherein axial displacement of the turn mechanism toward the rack collapses the spring, allowing the pinion gear of the rod to engage the rack.

8. The anti-icing system of claim 7, wherein the locking mechanism is operative to lock the anti-icing valve in a ¾ open position.

9. The anti-icing system of claim 7 further comprising a control operatively coupled to the anti-icing valve and operative to open and close the anti-icing valve.

10. The anti-icing system of claim 7 further comprising a nozzle positioned adjacent the nacelle and constructed and arranged to discharge the hot air onto the nacelle.

11. The anti-icing system of claim 7 further comprising a bleed valve constructed and arranged to bleed excess hot air from the compressor section.

12. A method of de-icing a nacelle in a gas turbine engine having a compressor section, the method comprising:

generating hot air in the compressor section;

discharging the hot air through an anti-icing system from the compressor section to the nacelle;

controlling a flow of the hot air from the compressor section to the nacelle with an anti-icing valve;

positioning the anti-icing valve in a partially open position to constrict a flow of the hot air from the compressor section to the nacelle; and locking the anti-icing valve in the partially open position using a locking mechanism, wherein the locking mechanism comprises:

a rod that is removably coupled to a piston through a rack and a pinion gear, wherein the rack is positioned on the piston and a pinion gear is provided at an end of the rod, and wherein the rod is movable into contact with the piston by axially displacing a turn mechanism coupled to the rod; and a spring biases the pinion gear of the rod out of contact from the rack, wherein axial displacement of the turn mechanism toward the rack collapses the spring, allowing the pinion gear of the rod to engage the rack.

13. The method of claim 12 further comprising locking the anti-icing valve in a ¾ open position.

14. The method of claim 12 further comprising operating a control to open and close the anti-icing valve.

15. The method of claim 12 further comprising channeling the hot air from the compressor section to the nacelle through a conduit.

16. The method of claim 12 further comprising discharging the hot air onto the nacelle through a nozzle.

17. The method of claim 12 further comprising bleeding excess hot air from the compressor section with a bleed valve.

* * * * *